US009372009B2

(12) United States Patent
Coogan

(10) Patent No.: US 9,372,009 B2
(45) Date of Patent: *Jun. 21, 2016

(54) PRESSURE CONTROL WITH COARSE AND FINE ADJUSTMENT

(75) Inventor: James J. Coogan, Des Plaines, IL (US)

(73) Assignee: Siemens Industry, Inc., Alpharetta, GA (US)

(*) Notice: Subject to any disclaimer, the term of this patent is extended or adjusted under 35 U.S.C. 154(b) by 1649 days.

This patent is subject to a terminal disclaimer.

(21) Appl. No.: 11/840,443

(22) Filed: Aug. 17, 2007

(65) Prior Publication Data
US 2009/0047894 A1    Feb. 19, 2009

(51) Int. Cl.
*F24F 11/00*    (2006.01)
*F24F 7/06*    (2006.01)
*F24F 7/00*    (2006.01)
*G05D 16/20*    (2006.01)

(52) U.S. Cl.
CPC .......... *F24F 11/0001* (2013.01); *G05D 16/204* (2013.01); *F24F 2011/0005* (2013.01); *F24F 2011/0038* (2013.01); *F24F 2011/0042* (2013.01)

(58) Field of Classification Search
CPC .................... F24F 11/0001; F24F 2011/0005; F24F 2011/0038; F24F 2011/0042; G05D 16/204
USPC .................. 454/229, 290, 238, 255; 236/49.3
See application file for complete search history.

(56) References Cited

U.S. PATENT DOCUMENTS

| 4,218,191 | A | * | 8/1980 | Stewart ............................ 417/19 |
| 4,460,036 | A | | 7/1984 | Yoshimi et al. |
| 4,997,030 | A | * | 3/1991 | Goto et al. ..................... 165/208 |
| 5,435,779 | A | * | 7/1995 | Sharp et al. ..................... 454/61 |
| 5,545,086 | A | | 8/1996 | Sharp et al. |
| 5,720,658 | A | * | 2/1998 | Belusa ........................ 454/238 |
| 5,863,246 | A | * | 1/1999 | Bujak, Jr. ..................... 454/255 |
| 6,219,590 | B1 | * | 4/2001 | Bernaden et al. ............. 700/277 |
| 6,571,855 | B1 | * | 6/2003 | Goldsmith et al. ........... 160/199 |
| 7,470,176 | B2 | * | 12/2008 | Morris et al. ................... 454/61 |
| 2005/0087238 | A1 | | 4/2005 | Wilson et al. |
| 2006/0237136 | A1 | * | 10/2006 | Nguyen et al. ........... 156/345.29 |
| 2007/0178823 | A1 | * | 8/2007 | Aronstam et al. ............ 454/256 |

FOREIGN PATENT DOCUMENTS

WO    WO 81/01455    5/1991

OTHER PUBLICATIONS

Siemens Building Technologies, Inc, "Room Presurisation Control," 125-2412Rev. 2, Jun. 2004.*

(Continued)

*Primary Examiner* — Helena Kosanovic

(57) ABSTRACT

A pressurization control system configured to regulate air pressure within a space includes a first damper fluidly coupled to an air supply, the first damper configured to control delivery of an air flow, and a second damper having an operating range, the second damper fluidly coupled to the air supply and the first damper, the second damper configured to supplement delivery of the air flow. The pressurization control system further includes a room controller configured to provide a control signal to the first and second dampers, wherein the control signal drives the first damper to direct the air flow towards the operating range, and wherein the control signal drives the second damper to direct the air flow towards a set point.

19 Claims, 3 Drawing Sheets

(56) References Cited

OTHER PUBLICATIONS

International Search Report dated Sep. 3, 2008 for Application No. PCT/US2008/008164.

Canadian office action citing reference.

Gartner, Leslie and Kiley, Christopher, "MEP Concepts and Technology," Anthology of Biosafety, vol. VIII, Evolving Issues in Containment, p. 73, American Biological Safety Association.

\* cited by examiner

PRESSURE CONTROL WITH COARSE AND FINE ADJUSTMENT

BACKGROUND

It is known to control and monitor the pressurization of a room and/or laboratory to ensure occupant health and safety, as well as to protect sensitive manufactured products. Healthcare facilities and research laboratories may utilize complex pressurization schemes in order to protect patients, personnel and researchers from hazardous viruses, pathogens, or other toxins. For example, a healthcare or research facility may seal and partially depressurize (generate a negative static pressure) a room or laboratory that contains a hazardous material. Thus, if a breach or accident occurs, air would flow towards the hazardous material, thereby containing and/or minimizing the potential spread or contamination.

Biological laboratories are often maintained at a negative static pressure specifically to prevent airflow out of the laboratory room. These laboratory rooms are constructed and classified as biosafety level 1, 2, 3 and 4 based on, for example, the nature and danger associated with the work and materials housed within the laboratory. Biosafety Level 4 (BSL-4) is the highest safety level classification indicating the greatest risk to individuals within a laboratory itself, the facility in which the laboratory is housed, and the surrounding areas. BSL-4 rated laboratories are constructed to be virtually leakproof, e.g., they are sealed so tightly that virtually no unintended air transfer or release occurs, thus minimizing the chance of contaminants escaping the laboratory. Alternatively, a BSL-4 rated laboratory could be a sealed room or enclosure into which another sealed, air tight container is placed. Regardless, in an effort to control or prevent the spread of a hazardous contaminants, BSL-4 rated laboratories are typically geographically isolated and operated at a high negative static pressure, e.g., 0.1 to 0.5 inches w.c. or 25 to 125 Pa.

In order to ensure and control the airflow and ventilation within a BSL-4 rated laboratory, the mechanical ventilation system(s) supplying the laboratory will typically be designed and controlled to deliver desired airflow rates and maintain selected pressure relationships between the laboratory and adjacent spaces. Certain pressure relationships must be maintained or controlled during transient conditions such as, for example, changes in pressure caused by the opening of a door or entrance. Known laboratory pressurization schemes such as, for example, differential flow control or airflow tracking are inapplicable in leakproof and/or sealed environments such as a BSL-4 rated laboratory where the relative supply and exhaust airflows are constant and may not be independently adjusted to establish a pressure differential. Similarly, direct pressure control and cascade pressure are unsuitable for tightly sealed environments where the transient conditions can severely and rapidly impact the desired pressure relationship.

There exists a need for a pressurization scheme or strategy that may be utilized in a tightly sealed environment such as, for example, a BSL-4 rated laboratory, to achieve and maintain a specific pressure relationship.

BRIEF DESCRIPTION OF THE FIGURES

Additional features and advantages of the present embodiments are described in, and will be apparent from, the following Detailed Description and the figures.

DETAILED DESCRIPTION

In order to maintain a desired pressure or pressure differential within a pressure controlled room or laboratory, it may be desirable to implement a pressure control system that utilizes a coarse flow control valve or damper in conjunction with a fine flow control valve or damper. Moreover, the coarse or first damper and the fine or second damper may be controlled by a room controller configured to provide both incremental flow and pressure control.

I. System Configuration

Figure 1:
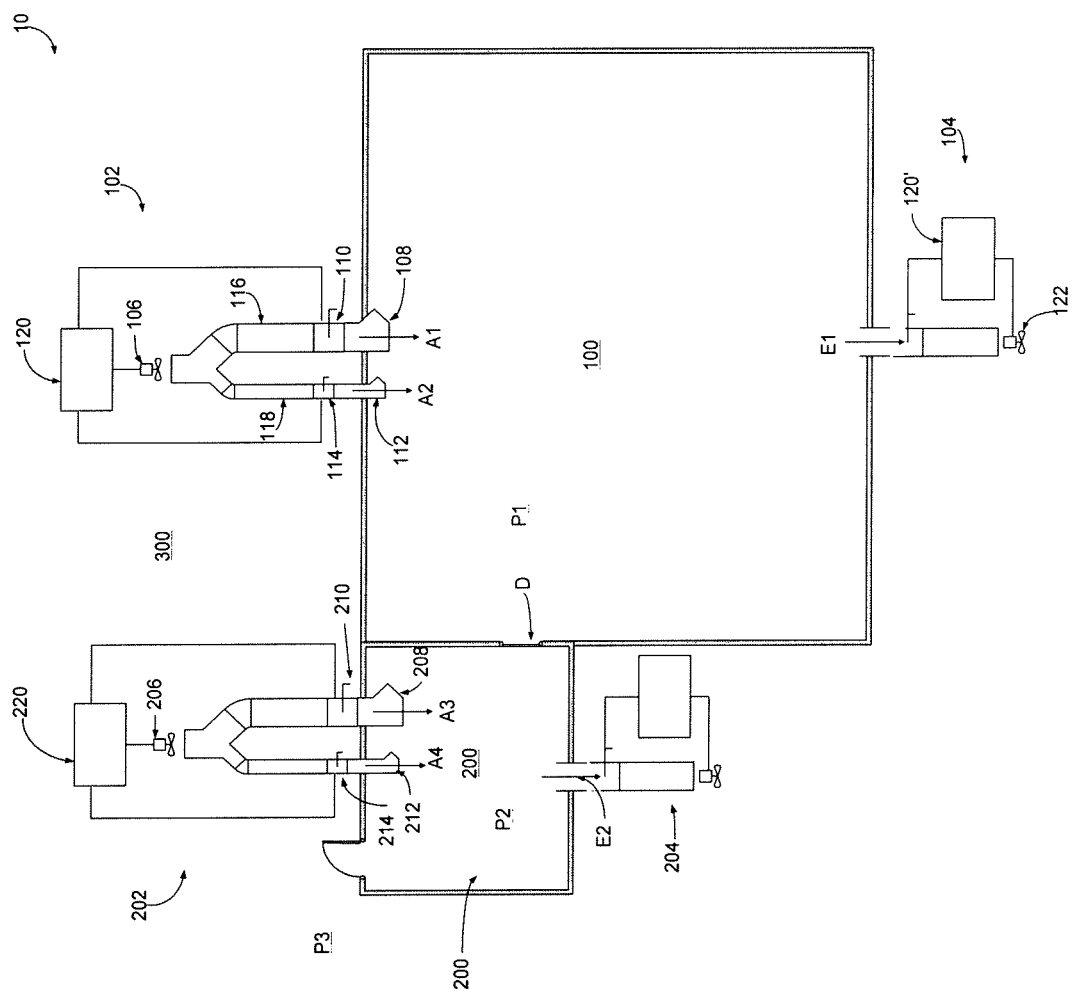
FIG. 1 illustrates an embodiment of a laboratory in a first airflow configuration that utilizes the pressure control system disclosed herein.

FIG. 1 illustrates one building layout 10 that may implement a pressure control system disclosed herein. The building layout 10 includes a room or laboratory 100 adjoined to a second room or airlock 200 via a sealable doorway D. The laboratory 100 may include an air delivery system 102 fluidly coupled to an exhaust 104. The air delivery system 102 and the exhaust 104, in this exemplary embodiment, may be configured to generate a first negative pressure P1 in the laboratory 100. The laboratory 100 may be a "leakproof" or otherwise sealed room in compliance with BSL-4 safety standards. In other embodiments, the laboratory 100 or other room may be sealed or have airflow regulated in compliance with other standards or specifications.

The airlock 200, similar to the laboratory 100, may include an air delivery system 202 fluidly coupled to an exhaust 204. The air delivery system 202 and the exhaust 204, in this exemplary embodiment, may be configured to generate a second negative pressure P2 in the airlock 200.

In the present example, the environs (generally indicated by the reference identifier 300) surrounding the laboratory 100 and airlock 200 will be assumed to be maintained generally at a third negative pressure P3. Moreover, as used throughout this exemplary embodiment, the pressure gradients between the three rooms or areas increase, e.g., become more negative, based upon proximity to the laboratory 100. For example, using the air pressure at a non-hazardous point in the building selected as the pressure reference, the third negative pressure P3 may be −25 Pa in the environs 300, the second negative pressure P2 may be −50 Pa in the airlock 200, and the first negative pressure P1 may be −75 Pa in the laboratory. Thus, if a leak or emergency occurs in the laboratory 100, the risk of contamination or escape of dangerous materials will be reduced because the pressure gradient will draw the air within the environs 300 and airlock 200 towards the laboratory 100 and the potential hazards. This in-rush of air towards the laboratory 100 prevents or limits the movement of the hazard towards the fluidly connected areas 200 and 300. In other words, in this configuration, air flows from areas of higher pressure, e.g., areas having less negative pressure, towards the partial vacuum within areas of lower pressure, e.g., areas that have a more negative pressure relative to the air source.

The air delivery system 102 and the exhaust 104 may be, as shown, autonomous and/or isolated from the air delivery system 202 and the exhaust 204. Isolation of the two air delivery systems 102, 202 and/or exhausts 104, 204 may be desirable in order to prevent cross-contamination of the two systems, limit the possibility of a simultaneous shutdown due to a system failure, and allow for independent control of the airlock 200 and laboratory 100. Alternatively, the air delivery system 102 and the exhaust 104 may be interconnected and/or fluidly coupled (not shown) to the air delivery system 202 and the exhaust 204. These systems 102, 202 and/or 104, 204 may be coupled, e.g., share a common air source and/or controller, to reduce the overall cost and complexity of the pressure control system.

In the present example, the air delivery system 102 and the exhaust 104 are isolated from the air delivery system 202 and the exhaust 204. The air delivery system 102 includes an air supply source 106 fluidly coupled to a first air outlet or supply vent 108 via a main valve or damper 110, and a second air outlet or supply vent 112 via a trim valve or damper 114. The air supply source 106 may be, for example, a propeller fan, a centrifugal fan, an air compressor or any other air movement or pressure generation device. The main damper 110 may be a moveable or positionable valve or diaphragm positioned to deliver or supply the majority of the air to the laboratory 100. In particular, the main air supply or air flow (indicated by the arrow A1) is supplied through a duct 116 connecting the air supply source 106 to the air outlet 108. The trim damper 114 may be a valve, diaphragm or damper similar to the main damper 110 configured and sized to deliver a small (compared to the air flow A1) or well-regulated amount of air to the laboratory 100. For example, the regulated or supplemental air supply or air flow (indicated by the arrow A2), provided through a duct 118 and the trim damper 114, supplements the main air supply A1 thereby allowing for fine flow and pressure adjustments to the overall pressure P1 of the laboratory 100.

The air within the laboratory 100 fluidly couples the air supply 106 and air outlets 108, 112 to exhaust air flow E1 through the exhaust 104. The exhaust air flow E1, in turn, pulls the air within the laboratory 100 from the room. The differential between the amount of flow of air provided via the air flows A1 and A2 and removed from the exhaust air flow E1, e.g., removing more air than is provided, generates the negative or vacuum pressure P1 within the laboratory 100. Pressure and flow sensors (not shown) may be positioned throughout the laboratory 100, at the air outlets 108, 112 and/or the exhaust 104 to measure the pressure, air flow and air flow differential within or through the laboratory 100.

A single room controller or controller 120 may be in communication with the air delivery system 102 and the exhaust 104 to control the air flows A1 and A2, and the exhaust air flow E1, respectively, within the laboratory 100. Alternatively, separate controllers 120, 120' (as shown) may be independently operating within the air delivery system 102 and the exhaust 104, respectively, to provide for independent control of these air handling systems. In particular, the controller 120 may utilize a processor (not shown) to execute control routines or programs stored on a computer readable medium or memory (not shown). The control routines may, in turn, calculate or otherwise determine the volume or amount of air to be provided by the air supply source 106. Alternatively, or in addition to, the control routines may calculate or determine the position of the main damper 110 and the trim damper 114 necessary to achieve the desired air flows A1 and A2 through the outlets 108, 112, respectively.

Similarly, the air delivery system 202 and the exhaust 204 includes an air supply source 206 fluidly coupled to a first air outlet 208 via a main damper 210, and a second air outlet 212 via a trim damper 214. The air supply source 206 may be, for example, the same type or style of air supply source 106 or may be a different source or generation system. The dampers 210 and 214 may operate and/or cooperate in a manner similar to the damper 108 and 112 to control and supply the main air flow A3 and the regulated airflow A4. The air within the airlock 200 fluidly couples the air supply 206 and the first and second air outlets 208, 212 to the exhaust 204 via exhaust air flow E2. Similar to the laboratory 100, pressure and flow sensors (not shown) may be positioned throughout the airlock 200 to provide readings and measurements to a room controller or controller 220. The controller 220 may be in communication with the air delivery system 102 and the controller 120 to regulate the air flows and pressures between the laboratory 100 and the airlock 200.

FIG. 1 further illustrates a steady state condition in which the laboratory 100 is sealed and the air delivery system 102 and exhaust 104 are operating independently from the airlock 200 and environs 300. In particular, in this situation the doorway D is closed, thereby preventing additional, higher pressure air from the airlock 200 from uncontrollably flowing into or entering the laboratory 100. In this configuration or state, the laboratory 100 is maintained at the pressure P1 by the cooperation of the airflows A1 and A2 provided via the main damper 110 and the trim damper 114. For example, the main damper 110 operates within a predefined operating range, e.g., a range defined by the high and low airflow rates that may be established, to achieve or create a pressure differential at or about the desired pressure P1. The predefined operating range of the main damper 110 includes a deadband between the high and low airflow limits and encompassing the desired pressure P1 in which the coarse airflow A1 is maintained at a constant. Once the main damper 110, and the provided coarse airflow A1, drives the room pressure sufficiently towards the desired pressure P1 to enter the deadband, the main damper 110 begins to maintain the airflow A1 at a constant flow rate. At this point, the trim damper 114, which only operates within the deadband of the main damper 110, begins to finely adjust the airflow A2 to achieve the desired pressure P1. In other words, the main damper 110 operates to provide the airflow A1 sufficient to bring the laboratory pressure to within the effective operating range of the trim damper 114 which, in turn, provides an airflow A2 necessary to achieve the desired pressure P1.

Figure 2:
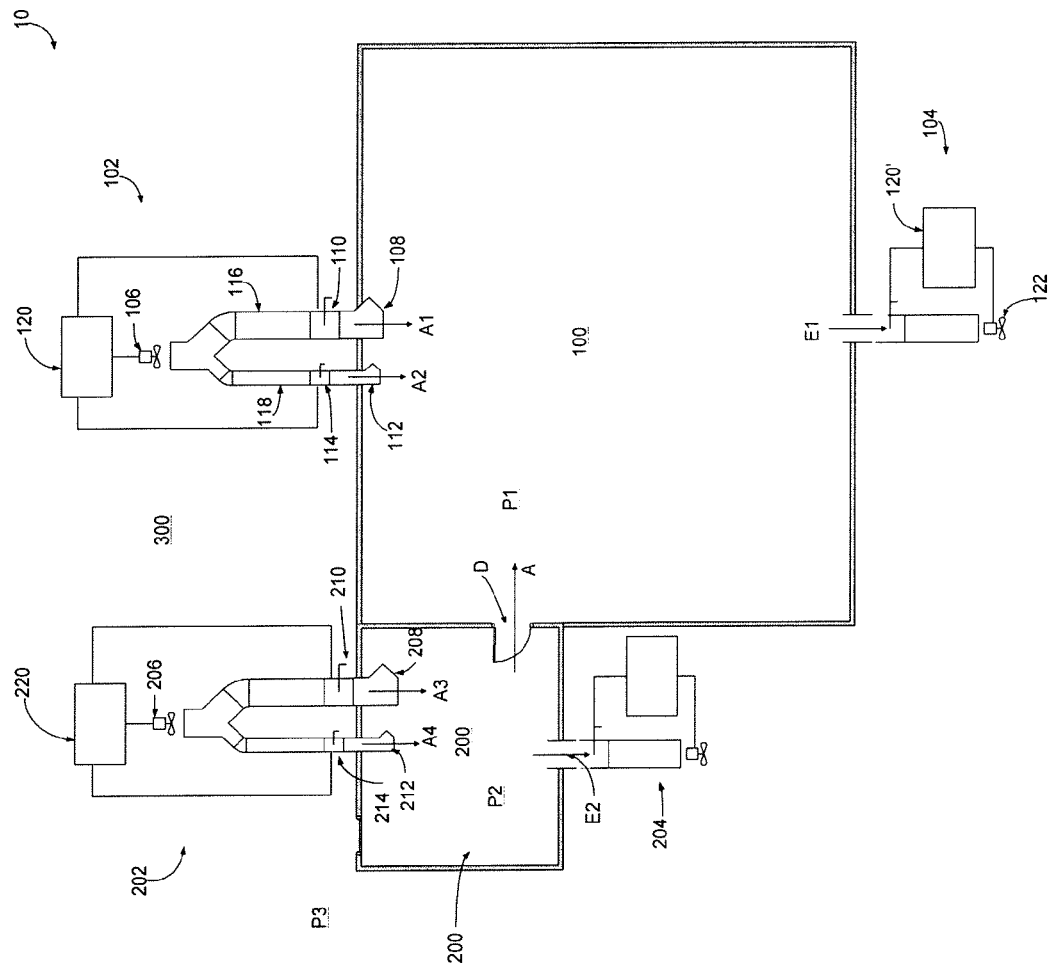
FIG. 2 illustrates an embodiment of the laboratory in a second airflow configuration that utilizes the pressure control system disclosed herein.

FIG. 2 illustrates a transient condition in which the doorway D to the airlock 200 is open or otherwise providing an additional airflow A to the laboratory 100 in an uncontrolled manner. For the purposes of the examples discussed herein, the additional airflow A is assumed to be provided by the airlock 200 which is maintained at a constant pressure by the controller 220.

II. System Operation

Figure 3:
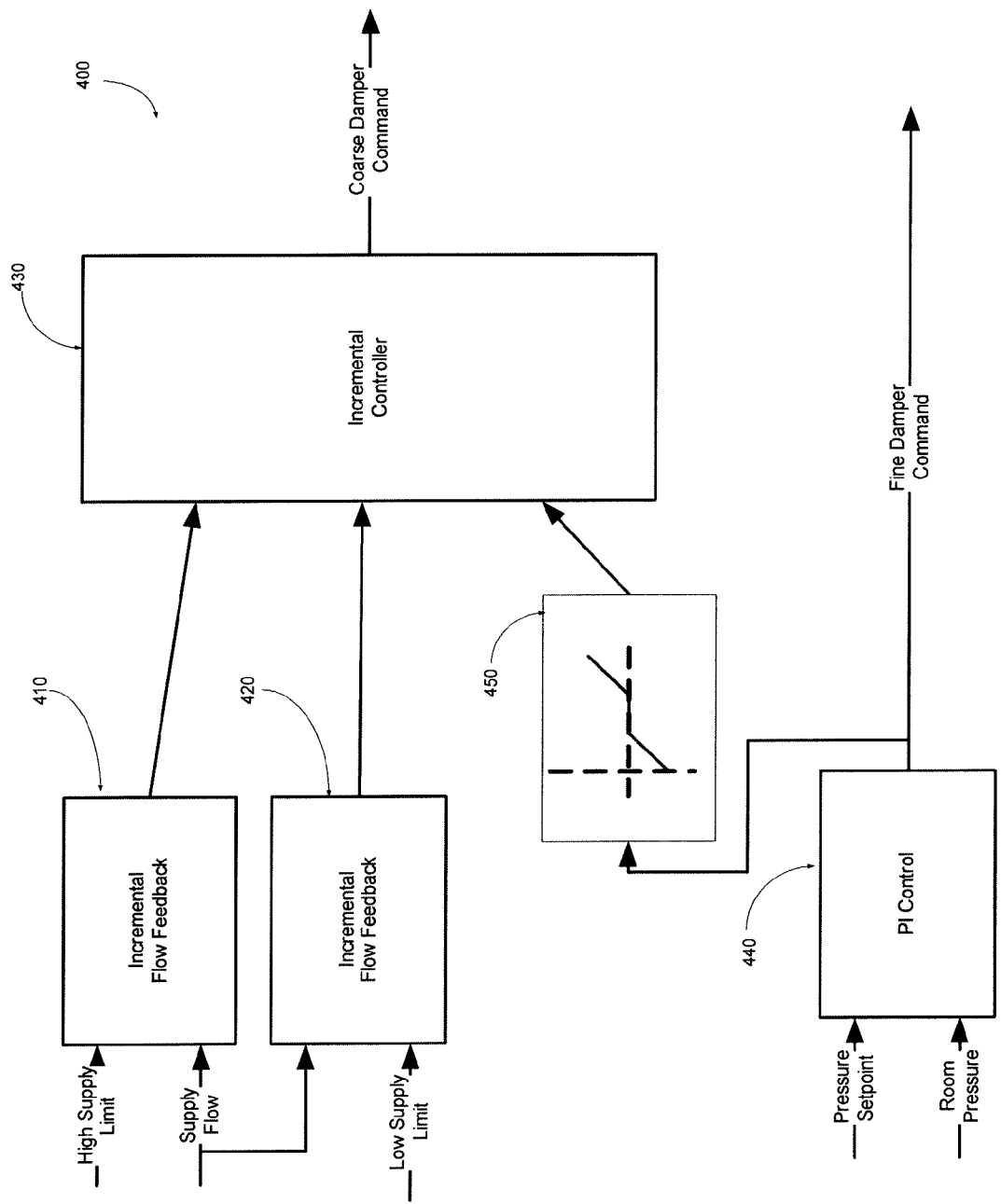
FIG. 3 illustrates a block diagram of a control scheme that may be utilized by a controller in one example.

FIG. 3 illustrates a room pressurization control routine 400 that may be implemented by the controller 120 (or the controller 220). The room pressurization control routine 400 utilizes multiple control schemes or mechanisms to control or regulate the pressurization of the laboratory 100 (or airlock 200) when the doorway D is closed. When the doorway D is open, additional airflow A is provided to the laboratory 100 (or from the airlock 200). The room pressurization control routine 400 may utilize: (a) a high flow feedback control algorithm 410; (b) a low flow feedback control algorithm 420; (c) an incremental controller 430 in communication with the high and low feedback control algorithms 410, 420; and (d) a pressure feedback algorithm or controller 440. The incremental controller 430 is configured to drive or control the main or coarse damper 110 in response to incremental control signals provided by the high and low feedback control algorithms 410, 420. The pressure feedback algorithm or controller 440 is configured to independently regulate the fine or trim damper 114 in response to pressure control signal generated with respect to a pre-defined or desired pressure set-point. The pressure feedback algorithm or controller 440 may be a proportional-integral controller; a proportional-integral-differential controller or a proportional-differential controller, or any other known controller. The room pressurization control routine 400 may further include a comparator or comparator algorithm 450 configured to control or regulate the interaction between the operating range and deadband of the main damper 110 and the operating range of the trim damper 114 which coincides with the deadband.

The control algorithms 410 and 420 operate to control the position of the damper 110 (and 210 if applicable) to thereby regulate the flow of air, and ultimately the pressure, within the laboratory 100 (and airlock 200 if applicable). However, only one of the three control algorithms 410, 420 and 440 is selected by the incremental controller 430. The selected control algorithm, in turn, determines the position of the main damper 110 (and/or 210) during any given time or selection period. For example, the high and low flow feedback control algorithms 410 and 420 may utilize and monitor the relative or differential air flows (e.g., the difference between air flows A1 and exhaust air flow E1) within the laboratory 100 in an effort to control or regulate the pressure P1.

The high and low flow feedback control algorithms 410 and 420 in cooperation with the comparator algorithm 450 drive or alter the airflow A1 provided by the main damper 110 to establish an air flow differential between the A1 and E1. As the air flow differential approaches the desired pressure P1, the main damper 110 approaches a deadband within its operating range. The deadband within the operating range of the main damper 110, in turn, coincides with the operating range of the trim damper 114. Within this deadband, the position, and hence the airflow A1 provided by the main damper 110, is held constant in response to a command, signal or instruction provided by the comparator 450, while the trim damper 114, now within its effective operating range and under the operational control of the pressure controller 440, makes the fine or final adjustments via the airflow A2 necessary to establish the desired pressure P1 within the laboratory 100. The position or relative location of the deadband (operating range of the trim damper 114) within the operating range of the main damper 110 will typically be determined by a pressure set point utilized by the pressure controller 440 and corresponding to the desired pressure P1. For example, the pressure set point monitored by the pressure controller 440 may be established within the middle of the operating range of the trim damper 114 which, in turn, may be within the middle of the operating range of the main damper 110. In this way, the effectiveness of both the damper 110,114 may be maximized by allowing the widest possible increase and decrease in the airflows A1, A2, respectively.

Some events may upset or disturb pressurization of the laboratory 100 in a way that requires a large change in air supply. For example, in response to a sudden decrease in pressure, the trim damper 114 may, in response to the pressure controller 440, shift to a position outside its normal operating range and away from the desired set point. The main damper 110, no longer held in a constant position, shifts or opens in response to the incremental controller 430, thereby increasing the airflow A1 and causing the pressure to increase within the laboratory 100. The pressure controller 440 responds by slowly closing or restricting the airflow A2 provided by the trim damper 114 as the pressure P1 increases towards the desired set point. When the trim damper 114 closes to a position within its operating range, e.g., the deadband within the operating range of the main damper 110, the position of the main damper 110 is locked or held, thereby preventing additional changes to the airflow A1. The trim damper 114, now acting within its operating range, continues to make the fine adjustments to the airflow A2 necessary to return the room pressure P1 to the desired set point stored within the pressure controller 440. Thus, the main damper 10 accomplishes large changes in overall supply flow (via the airflow A1), but does not directly interact or interfere with the small secondary or trim damper 114. The dampers 110, 114 operate in the opposite direction if a change requires a large reduction in air supply.

A. Changes in Response to an Increase in Exhaust Airflow

In one exemplary embodiment, the laboratory 100 may be operated in a "constant volume" configuration, which ensures that the flow rate (the exhaust flow E1 and the combined supply flow A1/A2) therethrough remains essentially unchanged or constant during normal operation. Normally large flow rate changes occur when the air delivery system 102 starts or stops. However, the exhaust 104 and/or other fluidly connected exhaust devices such as, for example, an exhaust fan 122, may be started and stopped during routine operation of the air delivery system 102. It may also be possible for the flow rate to change in response to events that occur along the fluidly coupled central exhaust system. For example, if the exhaust 204 were fluidly coupled to the exhaust 104 along a central conduit system, the operation of one of the exhausts will influence the operation of the other. The influence or interrelated effects of these two exhausts 104, 204, in this example, may be prevalent when the systems are started or stopped with respect to each other. The occurrence of these transitory events may temporarily change the exhaust airflow E1 from the laboratory 100, and it may require a response or change in the airflows A1 and A2 in response to the room pressurization control routine 400.

For example, when the laboratory 100 is operating in a normal, steady operating condition, the airflows A1 and A2 and the exhaust airflow E1 are essentially steady or constant and near or at their respective set points. In this configuration or state, the pressure P1 within the laboratory 100 is essentially steady or constant and near or at its set point. The trim damper 114 may be in a constant position or may making small movements to adjust the airflow A2 within its operating range, i.e., the deadband of the main damper 110, and around the desired pressure set point utilized by the pressure controller 440. Thus, in normal operation, the supply or main damper 110 is fixed in whatever position it takes to deliver the airflow A1 that, along with the airflow A2 delivered through the trim damper 114, balances the exhaust E1.

When a disturbance occurs in the exhaust 104 or the laboratory 100 that increases the exhaust airflow E1, the supply airflows A1 and A2 are out of balance and the pressure P1 within the laboratory 100 will start to decrease. The room pressurization control routine 400, and in particular the pressure controller 440, responds by opening the trim damper 114 thereby increasing the airflow A2 in an attempt to balance the increase in exhaust E1. If the airflow A2 through the trim damper 114 matches or balances the increase in exhaust E1 without leaving the operating range of the trim valve 114 (the deadband of the main damper 110), then balance may be restored and the flow rate within the laboratory 100 may be maintained without adjusting the main damper 110.

If the increase or change in the position of the trim damper 114 and the corresponding airflow A2 is not sufficient to balance the increase or change in the exhaust E1, then the trim damper 114 keeps opening to the limit of its operating range, thereby passing or exiting the deadband. This change reactivates the main damper 110 which allows for an increase in the airflow A1 as the damper opens. The increased airflow A1 provided by the main damper 110 has a greater effect on total supply airflow A1 and A2 than the trim valve 114, and increases the flow rate enough to balance the increased exhaust E1.

The increased total supply airflow A1 and A2 serves to bring the pressure P1 of laboratory 100 back toward the desired pressure set point thereby causing the trim damper 114 to move towards the closed position and decrease the airflow A2. As the trim damper 114 closes, it reenters its operating range or deadband, thereby locking the position of the main damper 110. The main damper 110 may be locked in response to a command or signal provided by the comparator 450 or in response to commands or signals provided by the pressure controller 440 or incremental controller 430. At this point, the pressure controller 440 is in primary control of the room pressurization control routine 400 and continues to adjust or drive the trim damper 110 to bring the pressure P1 back to the set point. The trim damper 114 may end up near the original position and the original airflow A1 before the change. The total supply airflow A1 and A2 ends up higher by approximately the amount of the increase of the exhaust E1. In this way, the main damper 110 balances the increased exhaust E1.

B. Changes in Response to an Increase in Supply Airflow

In the exemplary embodiment shown in FIG. 2, the laboratory 100 is fluidly connected to the airlock 200 via the doorway D. In this example, the airlock has a higher pressure P2 relative to the pressure P1 maintained in the laboratory 100. When the doorway between the rooms 100 and 200 is sealed, there exists little or no airflow A therebetween. Thus, the laboratory 100 maintains a balance between the total supply airflow A1 and A2 and the exhaust E1. In this configuration, the position of the main damper 110 is fixed because all three of its control functions are satisfied: (1) the high flow limit of the high flow feedback control algorithm 410 is above the current supply flow rate; (2) the low flow limit of the low flow feedback control algorithm 420 is below the current supply flow rate; and (3) the trim damper 114 is positioned within its operating range near its desired set point, well within the deadband as determined by the comparator 450.

When the doorway D opens to provide airflow A from the higher pressure airlock 200 to the laboratory 100, the opening (doorway D) is so large that the pressures equalize (P1=P2) almost instantly and remain equalized as long as the doorway D remains open. Initially, that new pressure for the two rooms 100 and 200 equalizes to a pressure somewhere between the original pressure levels P1 and P2 of the individual rooms 100 and 200.

For the purpose of illustration, assume the higher-pressure airlock 200 space remains at effectively a constant pressure P2 throughout the open doorway D event. As discussed above, as soon as the doorway D opens and the airflow A is provided to the laboratory 100, the pressure in the laboratory 100 increases to match the other airlock 200 (the initial gust of airflow A at the higher pressure P2 supplies the air needed to raise the pressure P1 to the pressure P2). In response to the increase in pressure, the pressure controller 440 responds by driving the trim damper 114 towards the closed position thereby limiting or reducing the airflow A2. As it does so, the total supply airflow A1 and A2 decreases and no longer balances the exhaust E1. A draft through the doorway D develops to make up the difference. The reduction in total supply airflow A1 and A2 is compensated by increases in the airflow A provided through the doorway D, so even though the fine or trim damper 114 moves toward a closed position, and the total supply airflow A1 and A2 decreases, the laboratory 100 pressure is maintained at higher pressure P2 of the airlock 200.

As the trim damper 114 closes in response to the pressure controller 440, it passes out of its operating range, e.g., the deadband. This transition activates the main damper 110, which, in turn, starts to close in an effort to restrict the airflow A1 and reduce the pressure within the laboratory 100.

As the flow reduction continues, it approaches or passes the low flow limit established within the low flow feedback control algorithm 420 operating within the laboratory 100. At this point, the trim damper 114 is fully closed. The pressure controller 440 continues to run, but has no further effect on the laboratory 100. Thus the low flow feedback algorithm and the low flow limit directly control position and airflow A1 provided by the main damper 110. If the doorway D remains open and continues to provide the airflow A for a sufficient period of time, pressure within the laboratory 100 will stabilize at the pressure P2 of the airlock 200. In this arrangement, the trim damper 114 is fully closed, the exhaust E1 may be maintained at its original rate, the airflow A1 is provided at the low flow limit associated with the low flow feedback control algorithm 420, and the airflow A operates as a draft through the doorway D to equalize the airflow between the exhaust E1 and the low flow limit. This condition may be maintained indefinitely, as long as the doorway D is open.

Upon closing of the doorway D, the airflow A is eliminated such that the exhaust E1 exceeds the total supply airflows A1 and A2 (A2 still being effectively at zero). This change in airflow results in a sudden pressure drop and the exhaust E1 removes air from the laboratory 100. As pressure within the laboratory 100 approaches the set point associated with the pressure controller 440, the trim valve 114 is driven towards its open position to supply positive airflow A2. As the trim damper 114 opens and increases the airflow A2 in an attempt to compensate and match the exhaust E1, it may pass through the deadband established within the operating range of the main damper 110 on the high side (e.g., the increasing flow side) causing the main damper 110 to leave the low flow limit of the low flow feedback algorithm 420 and to open to increase the airflow A1. This, in turn, increases the overall total supply airflow A1 and A2 and moves pressure P1 of the laboratory 100 back to the set point associated with the pressure controller 440. The pressure controller 440, in turn, responds by driving the trim damper 114 towards a closed position and reducing the airflow A2 back towards the deadband.

While the doorway D was open, the switch to the low flow feed back algorithm 420 prevents the main damper 110 from closing completely. This, in turn, limits the degree of control overshoot that occurs when the doorway D eventually closes.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A pressurization control system configured to regulate air pressure within a room, the room comprising a closeable doorway, the system comprising:
   a first damper fluidly coupled to an air supply duct and having an operating range, the first damper configured to control delivery of a main air flow directly to the room;
   a second damper having an operating range, the second damper fluidly coupled to a second air supply duct, the second damper configured to control delivery of a supplemental air flow directly to the room, the supplemental air flow being separate from the main air flow; and a room controller configured to:
provide a first control signal to the first damper and a second control signal to the second damper, the provision of the first control signal comprising selection of a control scheme from a plurality of control schemes the selection of the control scheme from the plurality of control schemes comprising selection of a high-flow feedback control scheme, a low-flow feedback control scheme, or a pressure feedback scheme to be run for a period of time, wherein in a first configuration, the first control signal drives the first damper to direct the main air flow towards a deadband within the operating range of the first damper, the deadband within the operating range of the first damper including a pressure set point for the room, and when the air pressure within the room is within the deadband within the operating range of the first damper, the second control signal drives the second damper to direct the supplemental air flow towards the pressure set point for the room, and wherein in response to the closeable doorway opening and the air pressure within the room increasing, the second control signal drives the second damper towards a closed position, and when the air pressure within the room exits the deadband, the first control signal drives the first damper towards a closed position until a low flow limit is reached.

2. The system of claim 1, wherein the second damper is a trim valve.

3. The system of claim 1, wherein the room controller includes an incremental controller and a pressure controller.

4. The system of claim 3, wherein the incremental controller is configured to generate an incremental control signal.

5. The system of claim 3, wherein the pressure controller is configured to generate the second control signal, the second control signal being a pressure feedback signal, and wherein the pressure feedback signal is communicated to the second damper.

6. The system of claim 3, wherein the pressure controller is selected from the group consisting of: a proportional-integral controller; a proportional-integral-differential controller or a proportional-differential controller.

7. A pressurization control system comprising:
an air supply;
a first damper fluidly coupled to the air supply duct and configured to deliver a main air flow directly to a room, the room comprising a closeable doorway, the first damper having a first operating range that includes a deadband;
a second damper fluidly coupled to a second air supply duct and configured to deliver a supplemental air flow directly to the room, the supplemental air flow being separate from the main air flow, the second damper having a second operating range that corresponds to the deadband;
a room controller configured to generate a first control signal and a second control signal, the generation of the first control signal comprising selection of a control scheme from a plurality of control schemes the selection of the control scheme from the plurality of control schemes comprising selection of a high-flow feedback control scheme, a low-flow feedback control scheme, or a pressure feedback scheme to be run for a period of time, wherein in a first configuration, the first control signal drives the first damper to a position corresponding to the deadband, and when air pressure within the room corresponds to the deadband, the second control signal drives the second damper to a position corresponding to the second operating range, and wherein in response to the closeable doorway opening and the air pressure within the room increasing, the second control signal drives the second damper towards a closed position, and when the air pressure within the room exits the deadband, the first control signal drives the first damper towards a closed position until a low flow limit is reached.

8. The system of claim 7, wherein the first damper is a coarse control valve, and wherein the second damper is a fine control trim valve.

9. The system of claim 7, wherein the room controller includes an incremental controller and a pressure controller.

10. The system of claim 9, wherein the incremental controller is configured to generate the first control signal, the first control signal being an incremental flow signal communicated to the first damper, and wherein the pressure control is configured to generate the second control signal, the second control signal being a pressure control signal communicated to the second damper.

11. The system of claim 10, wherein the pressure control signal is generated as a function of a pressure set point and a room pressure measurement.

12. The system of claim 1, wherein the room is a laboratory.

13. A pressurization control system configured to regulate air pressure within a room, the room comprising a closeable doorway, the system comprising:
a first damper fluidly coupled to an air supply duct and having an operating range, the first damper configured to control delivery of a main air flow directly to the room;
a second damper fluidly coupled to a second air supply duct and configured to control delivery of a supplemental air flow directly to the room, the supplemental air flow being separate from the main air flow; and
a room controller configured to control the first damper and the second damper, the control of the first damper comprising selection of a control scheme from a plurality of control schemes the selection of the control scheme from the plurality of control schemes comprising selection of a high-flow feedback control scheme, a low-flow feedback control scheme, or a pressure feedback scheme to be run for a period of time, the room controller configured, in a first configuration, to drive the first damper to direct the main air flow towards a deadband within the operating range, and when the air pressure within the room corresponds to the deadband, to drive the second damper to direct the supplemental air flow towards a pressure set point for the room, the deadband including the pressure set point for the room, wherein in response to the closeable doorway opening and the air pressure within the room increasing, the room controller is configured to drive the second damper towards a closed position, and when the air pressure within the room exits the deadband, the first control signal drives the first damper towards a closed position until a low flow limit is reached.

14. The system of claim 13, wherein the first damper is a coarse control valve, and wherein the second damper is a fine control trim valve.

15. The system of claim 13, wherein the room controller includes an incremental controller and a pressure controller, the incremental controller configured to control the first damper, and the pressure controller configured to control the second damper.

16. The system of claim 15, wherein the pressure controller is configured to control the second damper as a function of the pressure set point for the room and a room pressure measurement.

17. The system of claim 1, wherein the air supply is fluidly coupled to a main air outlet via the first damper, the main air outlet configured to deliver the main air flow to the room, and wherein the air supply is fluidly coupled to a supplemental air outlet via the second damper, the supplemental air outlet configured to deliver the supplemental air flow to the room.

18. The system of claim 1, wherein in the first configuration, the operating range of the second damper corresponds to the deadband within the operating range of the first damper.

19. The system of claim 1, wherein the room is a first room, the air supply is a first air supply, and the room controller is a first room controller,
wherein the pressurization control system further comprises a first air delivery system and a second air delivery system, the first air delivery system comprising the first damper, the second damper, and the first room controller, the second air delivery system comprising:
a third damper fluidly coupled to a second air supply and having an operating range, the third damper configured to control delivery of a main air flow to a second room, the second room being connected to the first room via the closeable doorway;
a fourth damper having an operating range, the fourth damper fluidly coupled to the second air supply, the fourth damper configured to control delivery of a supplemental air flow to the second room, the supplemental air flow to the second room being separate from the main air flow to the second room; and
a second room controller configured to provide a third control signal to the third damper and a fourth control signal to the fourh damper, and
wherein in a second configuration, the third control signal drives the third damper to direct the main air flow to the second room towards a deadband within the operating range of the third damper, the deadband within the operating range of the third damper including a pressure set point for the second room, the pressure set point for the second room being greater than the pressure set point for the first room, and when the air pressure within the second room is within the deadband within the operating range of the third damper, the fourth control signal drives the fourth damper to direct the supplemental air flow to the second room towards the pressure set point for the second room, and the third control signal maintains a position of the third damper constant to hold the main air flow to the second room constant.

* * * * *